US006318135B1

(12) United States Patent
Johnsen et al.

(10) Patent No.: US 6,318,135 B1
(45) Date of Patent: Nov. 20, 2001

(54) TAILGATE LOCKING ASSEMBLY

(76) Inventors: Roger L. Johnsen; Calvin S. Wang, both of 14317 E. Don Julian Rd., Industry, CA (US) 91746

( * ) Notice: Subject to any disclaimer, the term of this patent is extended or adjusted under 35 U.S.C. 154(b) by 0 days.

(21) Appl. No.: 09/468,890

(22) Filed: Dec. 22, 1999

(51) Int. Cl.[7] ..................... B60R 25/02

(52) U.S. Cl. ..................... 70/208; 292/DIG. 31; 292/DIG. 43

(58) Field of Search ............. 70/208, 209; 292/DIG. 29, 292/DIG. 31, DIG. 43, 336.3; 296/50, 57.1; 411/910, 911; 280/770

(56) References Cited

U.S. PATENT DOCUMENTS

| | | | | |
|---|---|---|---|---|
| 4,819,461 | * | 4/1989 | Pearson | 70/14 |
| 4,968,084 | * | 11/1990 | Asher et al. | 280/770 |
| 4,981,320 | * | 1/1991 | Bowman | 296/57.1 |
| 5,303,971 | * | 4/1994 | Johnsen et al. | 70/208 |
| 6,192,725 | * | 2/2001 | Watson et al. | 70/208 |
| 6,209,366 | * | 4/2001 | Zayoroff | 70/208 |

* cited by examiner

*Primary Examiner*—Richard M. Camby
(74) *Attorney, Agent, or Firm*—Albert O. Cota

(57) ABSTRACT

A tailgate locking assembly (10) designed to be attached to a tailgate latching mechanism (92) that operates a truck tailgate (90). The mechanism (92) includes a pull-handle (96) which controls the position of a pair of lever arms (98) connected to a pair of respective latching rods (100). The rods are normally spring-biased in an outward direction which maintains the tailgate (90) in a latched configuration. When the pull-handle (96) is pulled back, the latching rods (100) move inward which unlatches and allows the tailgate (90) to be lowered. The tailgate locking assembly (10) includes a bracket (12) that attaches to the mechanism (92) and that incorporates a locking arm (56) that can be placed in a first position (44) or a second position (46) by means of a key lock (30). When the arm (56) is in the first position (44) it is located against one of the lever arms (98) preventing the pull-handle (96) from releasing the latching rods (100). The tailgate (90) cannot be lowered until the key lock (30) is placed in the second position (46) which releases the lever arms (98) allowing the pull-handle (96) to be pulled back to release the latching rods (100) and allow the tailgate (90) to be lowered.

16 Claims, 3 Drawing Sheets

TAILGATE LOCKING ASSEMBLY

TECHNICAL FIELD

The invention pertains to the general field of truck tailgates and more particularly to a tailgate locking assembly that is adapted to be installed on a conventional tailgate latching mechanism.

BACKGROUND ART

One of the most popular vehicles in use today is the pickup truck. In addition to providing many different occupations with the necessary means by which to transport materials and equipment, pickup trucks are also widely used by persons who simply desire a mode of transportation that can conveniently transport additional items when needed. It is because of the varied uses of pickup trucks that so many different types and sizes are available. Even with the variety of pickup trucks that may be chosen, from those that are considered small or "light" trucks to the larger, heavy-load, dually models, all pickup trucks share certain characteristics.

The most obvious and noticeable characteristic is that all pickup trucks have a bed. The only differences in bed design are that a truck may have either a long bed or a short bed, or a truck can have the more popular and conventional enclosed bed or what is known as a flat bed, which is used almost exclusively for transportation of materials and/or equipment.

For pickup trucks with enclosed beds there is almost always a rear opening with a door-like structure known as a tailgate.

The purpose of the tailgate is to maintain the truck's bed enclosed on all sides, while still allowing access to the bed without the need for going over every wall structure. This is accomplished by having the tailgate hinged on its lower edge. A latch, which is usually located near the upper edge of the tailgate, keeps the tailgate securely closed.

Inevitably, unscrupulous persons realized that pickup trucks tailgates were valuable parts of a truck, and were relatively easy to steal. Additionally, once a tailgate is removed there is much easier access to whatever may be located in the truck's bed. As a result of this there have been attempts made to provide some means of locking a pickup truck tailgate. Unfortunately, not all of these devices function adequately, and therefore tailgates are still being stolen, much to the dismay of their owners. Obviously, if there were some way of efficiently and securely locking a tailgate, that could be purchased as an aftermarket accessory and was easy to install, it would be a great benefit to pickup truck owners.

A search of the prior art did not disclose any patents that read directly on the claims of the instant invention however, the following U.S. patents were considered related:

| U.S. Pat. No. | INVENTOR | ISSUED |
|---|---|---|
| 5,104,171 | Johnsen | 14 April 1992 |
| 5,004,287 | Doyle | 2 April 1991 |
| 4,529,351 | Olins | 16 July 1985 |
| 4,358,150 | Nash | 9 November 1982 |

The U.S. Pat. No. 5,104,171 discloses a tailgate guard assembly which incorporates a metal plate that closes off the handle recess. The plate is stiffened by an inwardly extending skirt welded to the back of the plate so that the skirt projects into the handle recess to hinder direct access into the handle recess under the edge of the plate. A hinge section along the top edge of the plate hooks in behind the outer panel of the tailgate along the top of the handle recess. A lock disposed near the lower end of one of the sides of the handle recess has a locking dog that rotates to a locking position in which it latches behind the outer panel of the tailgate without any structural modifications or additions to the tailgate.

The U.S. Pat. No. 5,004,287 discloses a locking device that is provided for a removable tailgate on a pickup truck. The tailgate assembly is supported by a pair of hinges located at the bottom of the tailgate. One of the hinges comprises an elongated pin member and receiver cup, the pin member extending from the truck body into the receiver cup located in the tailgate. An opening is provided in the side wall of the receiver cup to allow the pin member and consequently the tailgate to be removed when the opening is aligned with the narrow axis of the pin member. A cylinder lock and lock bolt is attached to the tailgate, the lock bolt extending through the end wall of the receiver cup. Upon engaging the lock, the lock bolt projects through the end wall of the receiver cup into an opening provided in the axis of the pin member, thereby allowing the tailgate to be locked to the pickup truck body while concurrently allowing the tailgate to be freely opened and closed along the horizontal axis of the hinges.

The U.S. Pat. No. 4,529,351 discloses a tail-gate assembly comprising a stationary support, a slide mounted on the stationary support, a platform pivotally mounted on the slide, a latch member mounted on and projecting laterally from the loading platform and a latch plate mounted on the stationary support. The notch is proportioned to receive the latch member in a close fitting relationship so as to provide a vertical restraint limiting vertical movement and a rotational restraint limiting rotational movement of the platform. A pair of latching jaws each having a locking tooth at one end thereof, are mounted on the latch plate for pivotal movement between a closed position in which the locking teeth extend inward from opposite sides of the entrance way to prevent withdrawal of the latching member from the notch and an open position in which the teeth are displaced outward from the entrance way to admit and release the latching member.

The U.S. Pat. No. 4,358,150 discloses a vehicle tailgate handle latch mechanism which includes a pair of latch assemblies carried by casings adapted to be fixed adjacent each side of the tailgate for engagement with an associated striker member on the vehicle body. A central lift handle rotates control rods about their axis such that the ends release pawl elements of their associated latch assemblies causing spring biased ratchet members to automatically rotate to a then open position unlatching their strikes allowing the tailgate to be moved to its open position.

For background purposes and as indicative of the art to which the invention relates, reference may be made to the following remaining patents found in the search:

| U.S. Pat. No. | INVENTOR | ISSUED |
|---|---|---|
| 4,981,320 | Bowman | 1 January 1991 |
| 4,968,084 | Asher, etal | 6 November 1989 |
| 4,819,461 | Pearson | 11 April 1989 |

DISCLOSURE OF THE INVENTION

The tailgate of most pickup trucks employ a tailgate latching mechanism which allows the tailgate to be latched without the security of a lock. The typical tailgate latching mechanism includes a rod attachment plate to which is attached a spring-loaded pull handle that control the position of a pair of lever arms. The lever arms are attached to a pair of horizontally displaced latching rods that are normally spring-biased in an outward latched direction. The ends of the rods are inserted into a respective pair of rod receptors which maintain the rods in their latched position until the pull-handle is pulled to release the rods and allow the tailgate to be lowered.

The inventive tailgate locking assembly is designed to be easily attached to the rod attachment plate to allow the tailgate to be securely locked. In its basic design, the assembly consists of a bracket, a key lock and a locking arm.

The bracket includes an upper section and a lower section. The upper section has means for being attached to the rod attachment plate, and the lower section has a lower bore.

The key lock has an outer sleeve and a rotatable inner core. The inner core has an outer protrusion that can be rotated with a key to either a first position or to a second position. The outer sleeve is inserted into the lower bore and is attached thereto by an attachment means.

The locking arm has an outer end and an inner end. The inner end has an arm bore dimensioned to be inserted into and attached to the outer protrusion by an attachment means. The locking arm can be rotated to either the first position or to the second position.

When the latching rods are in their normal extended latched position, the locking arm is rotated to the first position. In this first position the outer end of the locking arm interfaces with one of the lever arms, thereby preventing the pull handle from causing the two rods to be placed in their inward unlatched position. Thus, the tailgate remains locked until the locking arm is rotated to the second position. In this second position the latching arms are freed and can be placed in their unlatched position to allow the tailgate to be lowered.

In view of the above disclosure it is the primary object of the invention to produce a tailgate locking assembly that when attached to a conventional truck tailgate latching mechanism the tailgate can be securely locked.

In addition to the primary object of the invention it is also an object of the invention to produce a tailgate locking assembly that:

- can be designed with various sizes and shapes of brackets such as a Z-bracket. The size and shape of the bracket is dependent upon the design and configuration of the tailgate to be secured,
- can be operated with various types of key locks but preferably with a high-security circular keyway lock having several tumblers,
- can utilize an existing bezel by modifying the bezel to include a U-shaped slot to accommodate the key lock,
- can be easily installed with only household tools, and
- is cost effective from both a consumer and manufacturing points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
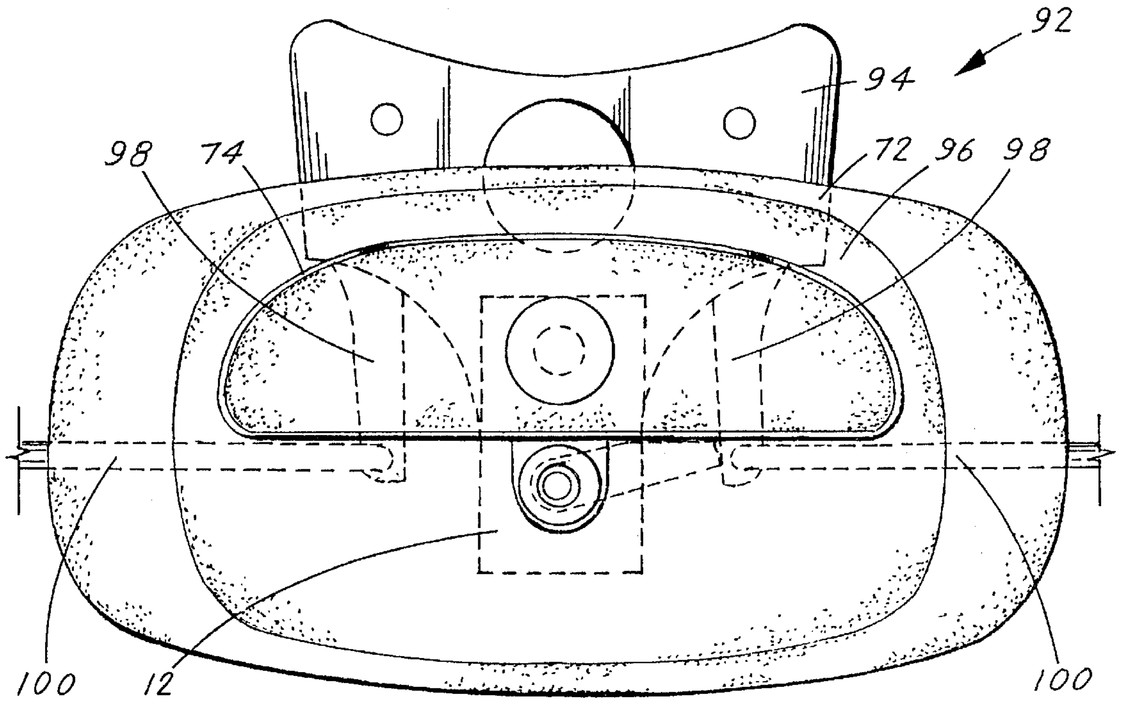
FIG. 1 is a front elevational view of a complete tailgate locking assembly which includes a bracket attached to tailgate latching mechanism, a locking arm, a pull handle and a bezel.

The best mode for carrying out the invention is presented in terms of a preferred embodiment for a tailgate locking assembly 10 which allows a truck tailgate 90 to be locked in its upward position. The tailgate locking assembly 10, as shown in FIGS. 1–10, is comprised of five major elements: a bracket 12, a key lock 30, a key 48 (not shown), a locking arm 56 and a bezel 72.

Figure 4:
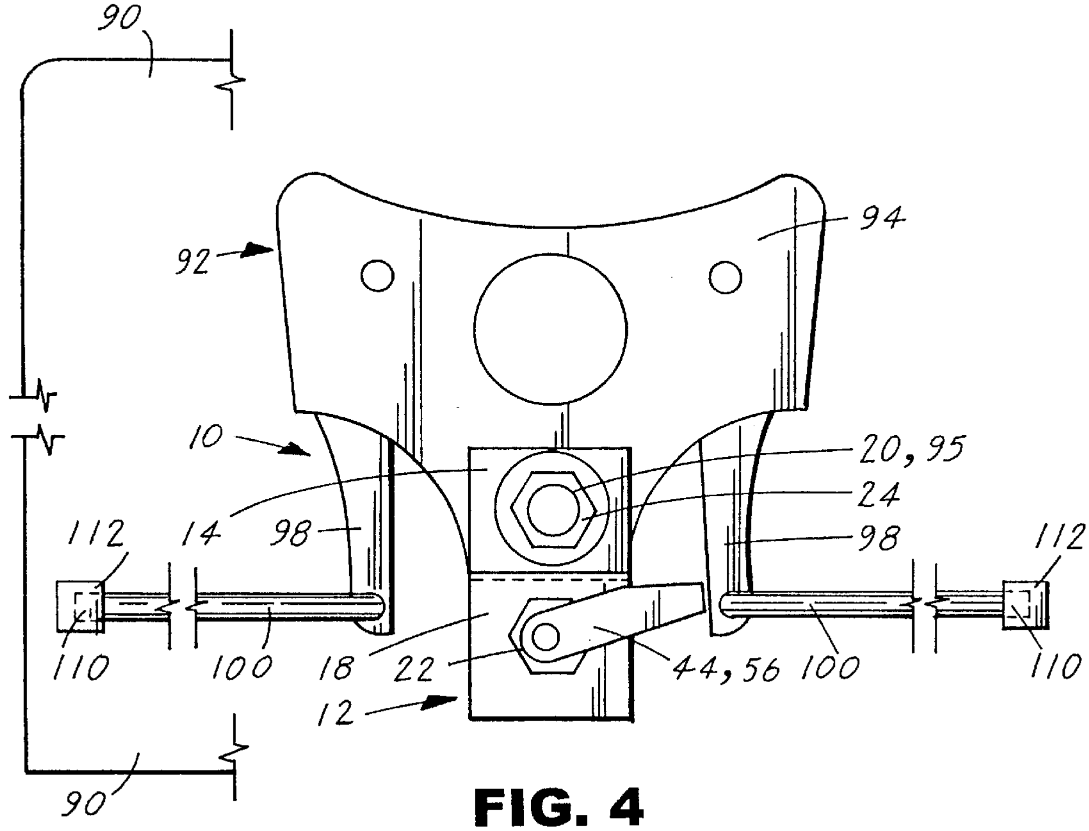
FIG. 4 is a rear elevational view of a tailgate latching mechanism shown in its latched configuration with the locking arm rotated to a locked position.

The tailgate locking assembly 10 functions in combination with the truck tailgate 90 which includes a tailgate latching mechanism 92. The mechanism 92 incorporates a rod attachment plate 94 which consists of a spring-loaded pull handle 96 that controls the position of a pair of lever arms 98. The lever arms 98 are attached to a pair of horizontally displaced latching rods 100 that are normally spring-biased in an outward latched direction as shown in FIGS. 1 and 4. The ends 110 of the rods 100 are inserted into respective rod receptors 112 which maintain the rods 100 in their latched position and thus the tailgate 90, in an upward latched position.

The size and shape of the bracket 12 is dependent upon the configuration of the tailgate 90 and its associated tailgate latching mechanism 92. As an example of the various bracket designs that can be utilized with the tailgate locking assembly 10, a Z-bracket 12 is disclosed.

Figure 3:
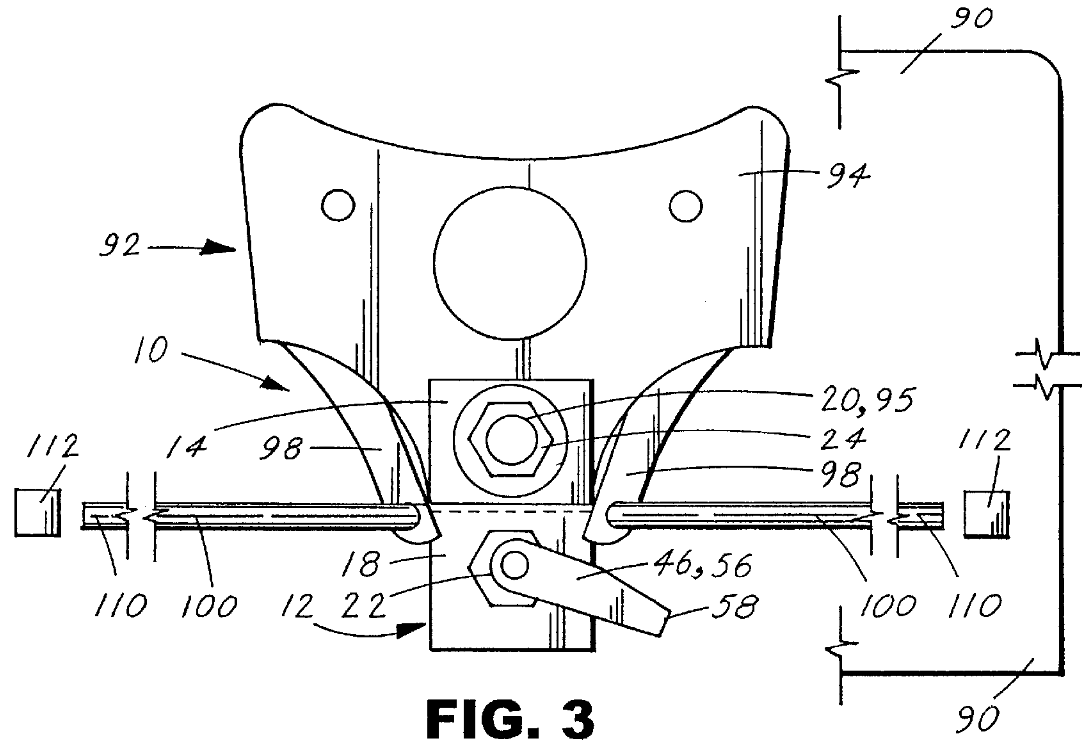
FIG. 3 is a rear elevational view of a tailgate latching mechanism shown in its unlatched configuration with the locking arm rotated to an unlocked position.

The Z-bracket 12, as shown attached to the rod attachment plate 94 in FIGS. 1, 3 and 4 and separated from the rod attachment plate 94 in FIGS. 5–10, includes an upper vertical section 14, a contiguous horizontal section 16 and a contiguous lower vertical section 18. The upper vertical section 14 has an upper bore 20 and the lower vertical section 18 has a lower bore 22. The upper bore 20 is aligned with a plate bore 95 located in the rod attachment plate 94. once aligned, a bolt 24 is inserted therethrough which attaches the Z-bracket 12 to the rod attachment plate 94. In some situations, the upper section of the bracket 12 can be attached to the rod attachment plate 94 by means of a welding or brazing process.

Figure 5:
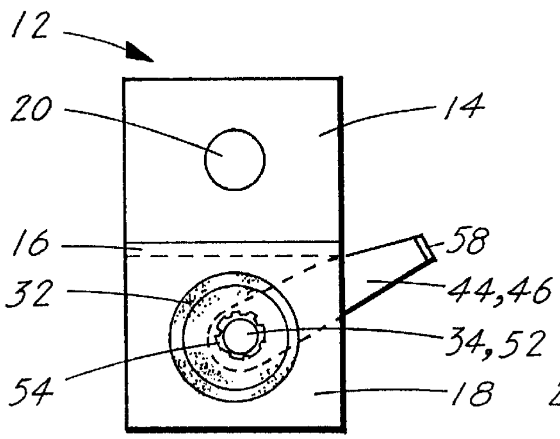
FIG. 5 is a front elevational view of a typical bracket shown with a key lock attached and the locking arm in a locked position.
Figure 7:
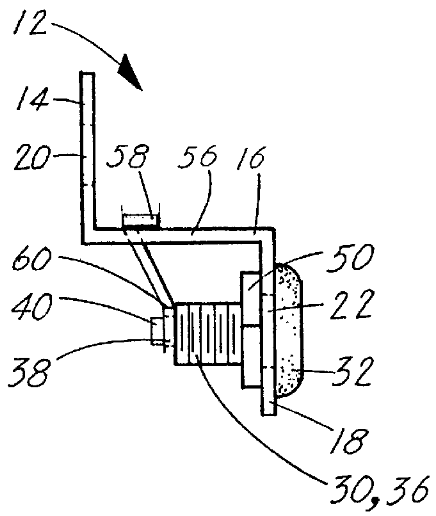
FIG. 7 is a left side elevational view of the typical bracket with the locking arm in a locked position.
Figure 8:
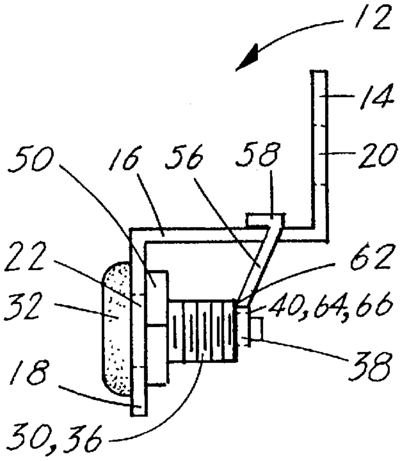
FIG. 8 is a right side elevational view of the typical bracket with the locking arm in a locked position.
Figure 9:
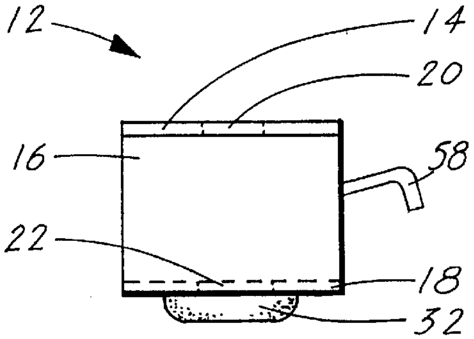
FIG. 9 is a top plan view of the typical bracket.
Figure 10:
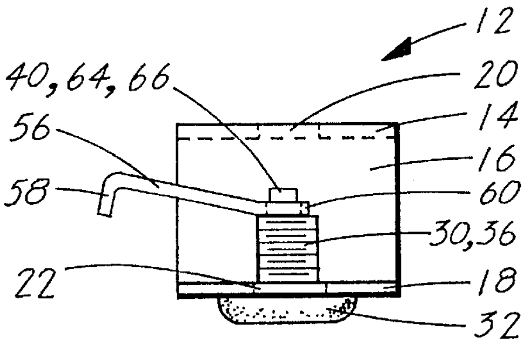
FIG. 10 is a bottom plan view of the typical bracket.

The lower vertical section 18 with the lower bore 22 is used to attach the key lock 30. The key lock 30, is best shown in FIGS. 7, 8 and 10, and includes a front end 32 that incorporates a key slot 34 as shown in FIG. 5, a threaded outer sleeve 36 and a rotatable inner core 38 having an outer protrusion 40. The protrusion 40 is designed to be placed in either a first position 44 or in a second position 46 by rotating the key 48 (not shown) that is inserted into the key slot 34. To attach the key lock 30, its front end 32 is inserted into the lower bore 22 located on the lower vertical section 18 of the Z-bracket 12. Once inserted, a nut 50 is screwed into the threaded outer sleeve 36 and tightened.

In the preferred embodiment of the tailgate locking assembly 10 the key lock 30, as shown in FIG. 5, is comprised of a high-security circular keyway lock 52 having a plurality of pin tumblers 54. However, the assembly 10 can function equally well by utilizing a key lock 30 that is operated with a straight key (not shown).

The next major element that comprises the tailgate locking assembly is the locking arm 56 as shown in FIGS. 3–10. The locking arm 56 has an outer end 58 and an inner end 60 which includes an arm bore 62 that is dimensioned to be inserted into the outer protrusion 40 and attached thereto by an attachment means 64. The attachment means 64 preferably consists of the locking arm 56 having a keyed bore 66 that is dimensioned to fit into the keyed section 42 on the outer protrusion 40. To secure the locking arm 56 a security bolt 68 is inserted over the keyed section 42. To provide maximum security, the key lock 30 and the locking arm 56 are constructed of a hardened steel.

Figure 6:
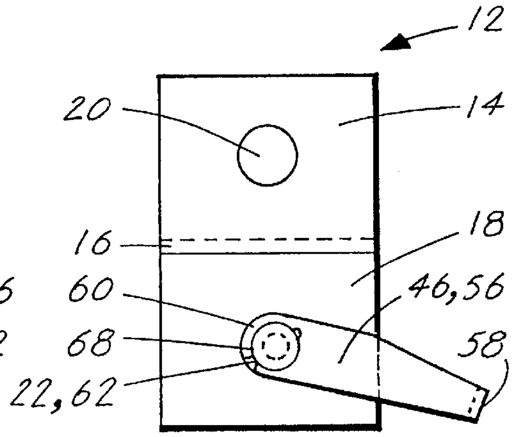
FIG. 6 is a rear elevational view of the typical bracket shown with a key lock attached and the locking arm in an unlocked position.

The locking arm 56 can be selectively set, by means of the key 48, to either the first position 44 as shown in FIGS. 4 and 5 or, to the second position 46 as shown in FIGS. 3 and 6. when the latching rods 100 are in their normal extended latched position, as shown in FIGS. 4 and 5, the locking arm 56 is rotated to the first position 44 which allows the outer end 58 of the locking arm 56 to interface with one of the lever arms 98 as shown best in FIG. 4. In this position, the pull handle 96, as shown in FIG. 1, is prevented from causing the two rods 100 to be placed in their inward unlatched positions. Thus, the tailgate 90 remains locked until the locking arm 56 is rotated to the second position 46, as shown in FIG. 3, in which position the tailgate 90 can be lowered.

Figure 2:
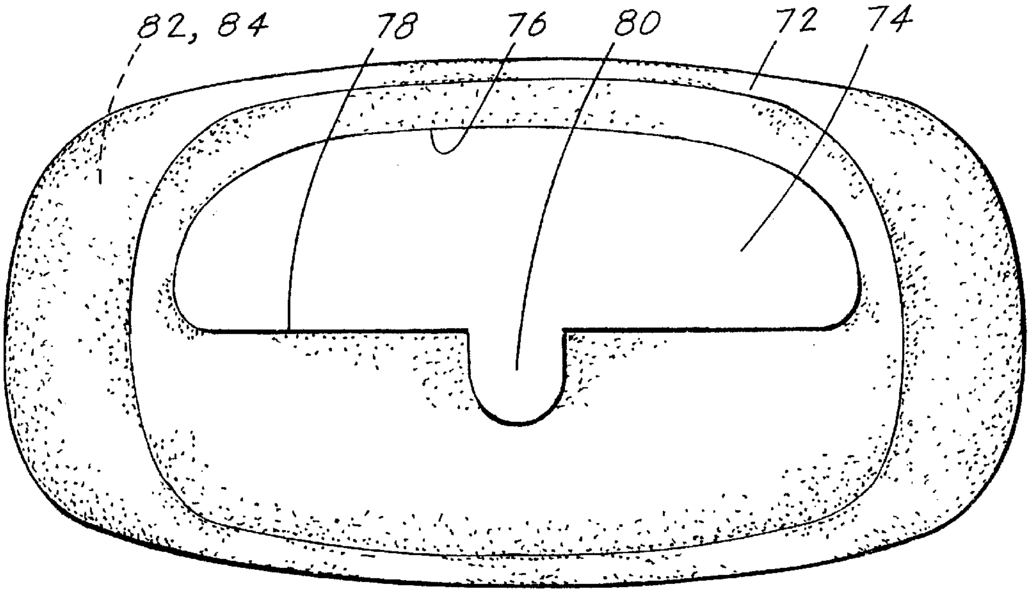
FIG. 2 is a front elevational view of the bezel shown removed from the tailgate locking assembly.

The final element of the tailgate locking assembly 10 is the bezel 72. The size and shape of the bezel 72, as is the case for the bracket 12, is also dependent upon the configuration of the tailgate 90 and its associated tailgate latching mechanism 92. A typical bezel 72 is shown in FIGS. 1 and 2, and includes a pull-handle opening 74 having an upper edge 76 and a lower edge 78. Substantially centered on the lower edge 78 is a U-shaped slot 80. The slot 80 is dimensioned to receive the key lock 30, as shown in FIG. 1, and aids in preventing the key lock 30 from being radially displaced if the nut 50 holding the key lock 30 should loosen. The bezel also has an inner surface 82 which includes means 84 for being attached to the tailgate latching mechanism 92.

While the invention has been described in complete detail and pictorially shown in the accompanying drawings it is not to be limited to such details, since many changes and modifications may be made to the invention without departing from the spirit and the scope thereof. Hence it is described to cover any and all modifications and forms which may come within the language and scope of the claims.

What is claimed is:

1. A tailgate locking assembly adapted to be used in combination with a tailgate, which incorporates a tailgate latching mechanism comprising a rod attachment plate consisting of a spring-loaded pull handle that controls the position of a pair of lever arms to which are attached a pair of horizontally displaced latching rods that are normally spring-biased in an outward direction where the ends of the rods are inserted into respective rod receptors, which maintain the tailgate in an upward latched position, wherein to release the rods from their outward latched position the spring-loaded pull-handle is pulled which causes the latching rods to move to an inward unlatch position, which temporarily disengages the ends of the rods from their respective rod receptors to allow the tailgate to be lowered, said tailgate locking assembly comprising:

a) a bracket having an upper section and a lower section wherein the upper section has a means for being attached to the rod attachment plate, and the lower section having a lower bore therethrough, b) a key lock having an outer sleeve and a rotatable inner core having an outer protrusion that can be rotated to either a first position or to a second position by a rotating means, wherein the outer sleeve is inserted into the lower bore and attached thereto by an attachment means, c) a locking arm having an outer end and an inner end, with the inner end having an arm bore dimensioned to be inserted into and attached to the outer protrusion by an attachment means, wherein said locking arm can be rotated to either the first position or to the second position, wherein when the rods are in their normal extended latched position, said locking arm is rotated to the first position which allows the outer end of the locking arm to interface with one of the lever arms, thereby preventing the pull handle from causing the two rods to be placed in their inward unlatched positions, thus the tailgate remains locked until the locking arm is rotated to the second position, in which position the tailgate can be lowered.

2. The tailgate locking assembly as specified in claim 1 wherein said means for attaching the upper section of said bracket to the rod attachment plate comprises: said upper section having an upper bore that is aligned with a plate bore in the rod attachment plate, wherein when a bolt is inserted into the upper bore and into the plate bore, said bracket is attached to the attachment plate.

3. The tailgate locking assembly as specified in claim 1 wherein said means for attaching the upper section of said bracket to the rod attachment plate comprises a welding or a brazing process.

4. The tailgate locking assembly as specified in claim 1 wherein said locking arm assembly is comprised of a lock assembly having a front end incorporating a key slot and an outer sleeve having a rotatable inner core having an outer protrusion that can be rotated to either the first position or to the second position by means of a key inserted into the key slot, wherein the outer sleeve is inserted into the lower bore and attached thereto by an attachment means.

5. The tailgate locking assembly as specified in claim 4 wherein said lock assembly is further comprised of a high security, circular keyway.

6. The tailgate locking assembly as specified in claim 5 wherein said circular keyway is comprised of a 7-pin tumbler.

7. The tailgate locking assembly as specified in claim 4 wherein said lock assembly is further comprised of a lock operated with a straight key.

8. The tailgate locking assembly as specified in claim 1 wherein said means for attaching the inner section to the lower bore comprises: said outer sleeve having a threaded section inserted into the lower bore and attached thereto by means of a nut screwed into the threaded outer sleeve.

9. The tailgate locking assembly as specified in claim 1 wherein said means for attaching said locking arm to the outer protrusion comprises:

a) said outer protrusion having a keyed section, b) said locking arm having a keyed bore dimensioned to fit into the keyed section, and c) a security bolt inserted over the keyed section.

10. The tailgate locking assembly as specified in claim 1 further comprising a bezel with a pull handle opening having an upper edge and a lower edge, with the lower edge having a substantially centered U-shaped slot dimensioned to receive said key lock, said bezel having an inner surface which includes means for being attached to the tailgate locking bracket.

11. A tailgate locking assembly adapted to be used in combination with a tailgate, which incorporates a tailgate latching mechanism comprising a rod attachment plate consisting of a spring-loaded pull handle which controls the position of a pair of lever arms to which are attached a pair of horizontally displaced latching rods that are normally spring-biased in an outward direction where the ends of the rods are inserted into respective rod receptors which maintain the tailgate in an upward latched position, wherein to release the rods from their outward latched position the spring-loaded pull handle is pulled which causes the latching rods to move to an inward unlatched position, which temporarily disengages the ends of the rods from their respective rod receptors to allow the tailgate to be lowered, said tailgate locking assembly comprising:

a) a Z-bracket having an upper vertical section, a contiguous horizontal section and a contiguous lower vertical section, wherein the upper vertical section having an upper bore and the lower section having a lower bore, wherein the upper bore is aligned with a plate bore in the rod attachment plate and a bolt is inserted therethrough which attaches said bracket to the rod attachment plate, b) a key lock having a front end incorporating a key slot, a threaded outer sleeve and a rotatable inner core having an outer protrusion that can be rotatably placed in either a first position or in a second position by rotating a key inserted into the key slot, wherein the front end of said key lock is inserted into the lower bore on the lower vertical section of said Z-bracket and attached thereto by means of a nut screwed into the threaded outer sleeve, and c) a locking arm having an outer end and an inner end, with the inner end having an arm bore that is dimensioned to be inserted into the outer protrusion and attached thereto by an attachment means, wherein said locking arm can be selectively set, by means of the key, to either the first position or to the second position, wherein when the latching rods are in their normal extended latched position, said locking arm is rotated to the first position which allows the outer end of the locking arm to interface with one of the lever arms, thereby preventing the pull handle from causing the two rods to be placed in their inward unlatched positions, thus the tailgate remains locked until the locking arm is rotated to the second position, in which position the tailgate can be lowered.

12. The tailgate locking assembly as specified in claim 11 wherein said key lock is comprised of a high-security circular keyway lock having a plurality of pin tumblers.

13. The tailgate locking assembly as specified in claim 11 wherein said key lock is comprised of a lock operated with a straight key.

14. The tailgate locking assembly as specified in claim 11 wherein said means for attaching said locking arm to the outer protrusion comprises:

a) said outer protrusion having a keyed section, b) said locking arm having a keyed bore dimensioned to fit into the keyed section, and c) a security bolt inserted over the keyed section.

15. The tailgate locking assembly as specified in claim 11 wherein said key lock and said locking arm are constructed of hardened steel.

16. The tailgate locking assembly as specified in claim 11 further comprising a bezel having a pull-handle opening having an upper edge and a lower edge, with the lower edge having a substantially centered, U-shaped slot dimensioned to receive said key lock, said bezel having an inner surface which includes means for being attached to the tailgate latching mechanism.

* * * * *